(12) United States Patent
Onomatsu

(10) Patent No.: US 7,353,529 B2
(45) Date of Patent: Apr. 1, 2008

(54) BROADCAST RECEPTION DEVICE AND METHOD CAPABLE OF OBTAINING BROADCAST TIME INFORMATION

(75) Inventor: Takehiro Onomatsu, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 691 days.

(21) Appl. No.: 10/650,413

(22) Filed: Aug. 28, 2003

(65) Prior Publication Data

US 2004/0078830 A1 Apr. 22, 2004

(30) Foreign Application Priority Data

Aug. 30, 2002 (JP) .............................. 2002-254115

(51) Int. Cl.
*H04N 5/50* (2006.01)
(52) U.S. Cl. .................. 725/38; 725/135; 725/136; 348/731
(58) Field of Classification Search ................ None
See application file for complete search history.

(56) References Cited

U.S. PATENT DOCUMENTS

| | | | | |
|---|---|---|---|---|
| 4,620,229 A | * | 10/1986 | Amano et al. | ................ 725/27 |
| 5,561,461 A | * | 10/1996 | Landis et al. | ................ 348/725 |
| 5,907,323 A | * | 5/1999 | Lawler et al. | ................ 725/41 |
| 2003/0237100 A1 | * | 12/2003 | Piotrowski | ................ 725/135 |

FOREIGN PATENT DOCUMENTS

| JP | 8-129083 | 5/1996 |
|---|---|---|
| JP | 10-23344 | 1/1998 |
| JP | 10-178621 | 6/1998 |
| JP | 10-313447 | 11/1998 |
| JP | 11-317913 | 11/1999 |
| JP | 2000-92426 | 3/2000 |
| JP | 2001-275090 | 10/2001 |

OTHER PUBLICATIONS

Office Action for Japanese Application No. 2002-254115, Mailed May 30, 2006 (4 pages).
Patent Abstracts of Japan, Publication No. 08-129083, Publication Date May 21, 1996 (1 page).
Patent Abstracts of Japan, Publication No. 10-178621, Publication Date Jun. 30, 1998 (1 page).

(Continued)

*Primary Examiner*—Christopher Grant
*Assistant Examiner*—Oschta Montoya
(74) *Attorney, Agent, or Firm*—Osha·Liang LLP

(57) ABSTRACT

During an operation performed to obtain time information of a previously designated channel when an XDS scanning master detects from an interrupt that a user designates his/her favorite channel via a key the master cancels the operation performed for the previously designated channel to obtain time information, and a tuner setting master shifts from the previously designated channel to the favorite channel and starts to receive a broadcast signal corresponding to the favorite channel. The XDS scanning master performs an operation to obtain time information from the broadcast signal corresponding to the favorite channel received. Whenever a favorite channel is designated, a current operation to obtain time information is canceled and a favorite channel currently designated by a user is preferentially subjected to the operation to obtain time information.

10 Claims, 5 Drawing Sheets

OTHER PUBLICATIONS

Document Bibliography and Abstract, Patent No. JP10023344 published Jan. 23, 1998, 1 pg.
Document Bibliography and Abstract, Patent No. JP10313447 published Nov. 24, 1998, 1 pg.
Document Bibliography and Abstract, Patent No. JP11317913 published Nov. 16, 1999, 1 pg.
Document Bibliography and Abstract, Patent No. JP200092426 published Mar. 31, 2000, 1 pg.
Document Bibliography and Abstract, Patent No. JP2001275090 published Oct. 5, 2001, 1 pg.

* cited by examiner

| CHANNEL NO. | REGISTRATION/ UNREGISTRATION WITH CHANNEL MAP | FLAG INDICATIVE OF EXISTENCE OF XDS |
|---|---|---|
| 1 | UNREGISTERED | -1 |
| 2 | REGISTERED | -1 |
| 3 | REGISTERED | 0 |
| 4 | REGISTERED | 1 |
| 5 | REGISTERED | 0 |
| 6 | UNREGISTERED | -1 |
| 7 | UNREGISTERED | 0 |
| 8 | REGISTERED | 1 |
| ⋮ 99 101 | ⋮ | ⋮ |

BROADCAST RECEPTION DEVICE AND METHOD CAPABLE OF OBTAINING BROADCAST TIME INFORMATION

BACKGROUND OF THE INVENTION

1. Field of the Invention

The present invention relates generally to broadcast signal reception devices and methods and particularly to broadcast reception devices and methods that allow reception of time information broadcast in conjunction with a television (TV) signal.

2. Description of the Background Art

A broadcast reception system has a so-called auto adjust system mounted therein to allow information of the current time superimposed on a broadcast signal as extended data services (XDS) to be obtained and used for time adjustment for the broadcast reception system.

The information of the current time is not broadcast by all broadcast stations. Accordingly, the system does tuning with respect to all channels to check a channel on which the information of the current time is broadcast. One such known system performs automatic tuning with respect to all channels to check a channel on which reception of XDS information is detected that has a smallest channel number.

During the broadcast reception system's tuning operation with respect to all channels, as described above, when an operator provides an input to designate a channel on which the information of the current time should be obtained the system still continues the tuning operation and until it completes the tuning operation for all of the channels it does not accept the input. As such, the system is inferior in operability.

The tuning operation with respect to all channels, as described above, can be replaced, as follows: a user can designate a channel broadcasting XDS information including the information of the current time and the system can receive a broadcast signal of the designated channel and obtain therefrom the information of the current time. However, the user must previously know a channel broadcasting the information, which provides poor practicality.

Receiving a broadcast signal to obtain XDS information therefrom is disclosed for example in Japanese Patent Laying-Open Nos. 10-23344, 10-313447, 11-317913, 2000-92426 and 2001-275090. None of these publications discloses a procedure in which during an operation by a reception system to automatically obtain XDS information when the user designates a channel the system interrupts the operation and rapidly accepts the designation to obtain XDS information with respect to the designated channel.

SUMMARY OF THE INVENTION

The present invention contemplates a broadcast reception device and method excellent in operability to obtain time information from a broadcast signal.

In accordance with the present invention in one aspect the broadcast reception device includes: a reception portion for receiving a broadcast signal; and a time information acquisition portion for performing an operation searching for and acquiring time information for counting a current time. The time information acquisition portion includes a signal extraction portion extracting from the broadcast signal received by the reception portion a broadcast signal corresponding to a designated channel, and an information search portion searching for the time information from the broadcast signal extracted by the signal extraction portion. Whenever a desired channel is designated the time information acquisition portion cancels the time information acquisition operation currently performed and performs the time information acquisition operation with respect to the desired channel currently designated.

During an operation performed to obtain time information with respect to a designated channel when a desired channel is designated the operation currently performed to obtain time information is canceled and the currently designated, desired channel is subjected to an operation to obtain time information.

Preferably, the above device further includes a channel designation portion for designating the desired channel via an external operation. A desired channel can be designated by an external operation.

Preferably, the channel designation portion includes a portion for selecting and designating the desired channel from a channel group allowing a corresponding broadcast signal to be received by the reception portion. As the desired channel is a channel allowing a corresponding broadcast signal to be received, the information search portion can search with an enhanced hit ratio to further ensure that time information is obtained.

Preferably, the channel designation portion includes a portion for selecting and designating the desired channel from a channel group with a corresponding broadcast signal transmitted thereon.

As a desired channel can be selected from a group of channels on which corresponding broadcast signals are broadcast, the channel can be selected with higher degrees of freedom.

Preferably, the channel designation portion further includes a channel list display portion displaying the channel group in a list. A group of channels in a list displayed can be confirmed while a desired channel can be selected.

Preferably, the channel designation portion includes a portion for directly designating the desired channel. A desired channel can be designated directly, rather than from a previously prepared group of channels and designated.

Preferably, the above device further includes a processing portion activated when a decision to acquire time information is not indicated with respect to a search performed on the desired channel by the search portion for the time information, and the processing portion designates a channel unsearched by the search portion for the time information and causes the time information acquisition portion to perform the acquisition operation.

As such, when a decision is not indicated to obtain time information in accordance with a result of searching a desired channel an operation to obtain time information of the desired channel is replaced by an operation to obtain time information with respect to a channel unsearched for time information.

In accordance with the present invention in another aspect a broadcast reception method includes the steps of: receiving a broadcast signal; and acquiring time information, performing an operation searching for and acquiring time information for counting a current time. The step of acquiring includes the steps of: extracting a broadcast signal corresponding to a designated channel from a broadcast signal received at the step of receiving; and searching for the time information from a broadcast signal extracted at the step of extracting. Whenever a desired channel is designated the step of acquiring cancels the acquisition operation currently performed and performs the acquisition operation with respect to the desired channel currently designated.

During an operation performed to obtain time information with respect to a designated channel when a desired channel is designated the operation currently performed to obtain time information is canceled and the currently designated, desired channel is subjected to an operation to obtain time information.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention in an embodiment will now be described with reference to the drawings specifically. In general, XDS information includes time information indicative of the current time as well as a program's name, program ranking information and the like. In the following, however, to simplify the description, XDS information is assumed to be time information indicating the current time.

Figure 1:
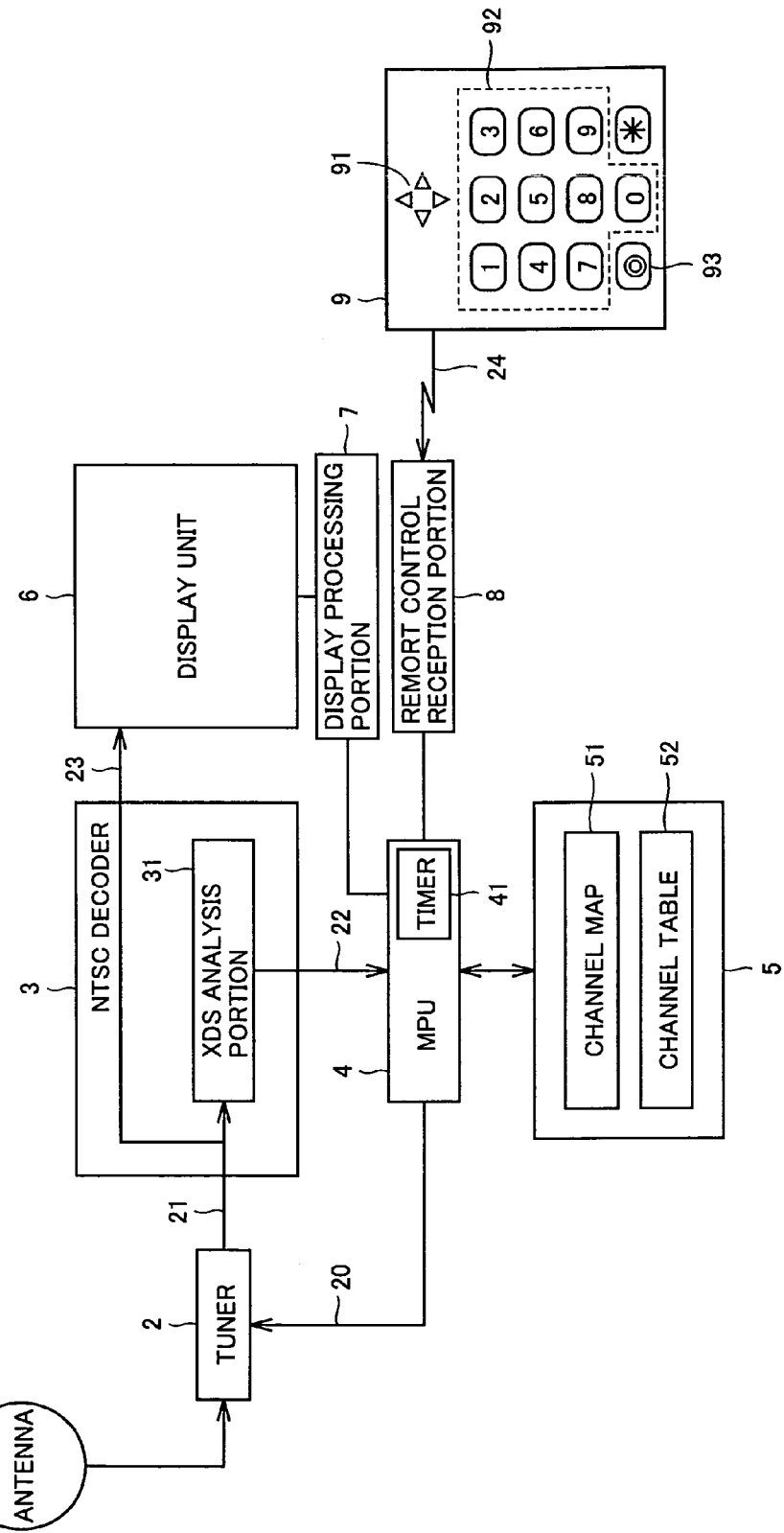
FIG. 1 shows a configuration of a reception system applied to an embodiment of the present invention.

FIG. 1 shows a configuration of a reception system applied to an embodiment of the present invention. While the FIG. 1 configuration shows a system employed in receiving a broadcast signal conforming to the National Television System Committee (NTSC) standard, the system may receive a broadcast signal conforming to the Advanced Television System Committee (ATSC) standard. In the latter case, XDS information is replaced and Rating Region Table (RRT) information is instead applied.

In FIG. 1 the reception system includes: an antenna 1 receiving a broadcast signal; a tuner 2 tuned in accordance with a tuning signal 20 indicative of a frequency of a predetermined channel to selectively extract and output a broadcast signal received by antenna 1 that is a broadcast signal 21 corresponding to the predetermined channel; an NTSC decoder 3 receiving broadcast signal 21 from tuner 2 and processing the signal to output XDS extraction information 22 and a video signal 23; a microprocessor unit (MPU) 4 intensively controlling the reception system itself; a memory 5 storing a variety of information accessed by MPU 4; a display unit 6 displaying information for example of an image in accordance with information supplied; a display processing portion 7 for displaying information on display unit 6 in accordance with On Screen Display (OSD) or the like; and a remote control reception portion 8 receiving an operation signal 24 for example of an infrared ray from a controller 9 and converting the received operation signal 24 to data to provide the data to MPU 4.

MPU 4 internally has a timer 41. When the current time in accordance with XDS information is obtained, timer 41 is set to the current time and counts it.

NTSC decoder 3 has an XDS analysis portion 31 that receives broadcast signal 21, extracts XDS information superimposed on signal 21 for a predetermined period (e.g., a 21st horizontal scanning period of video signal 23), converts a result of the extraction to digital XDS extraction information 22, and outputs it to MPU 4. When XDS information has successfully been extracted, XDS extraction information 22 indicates the extracted XDS information. When XDS information is not extracted, information 22 indicates information accordingly.

Remote controller 9 has a main surface provided with an operation panel for users. The operation panel has a cursor key 91 operated to move a cursor, described later, in display unit 6 on a screen laterally and vertically, a numeral key 92 operated to directly designate a desired channel, and a decision key 93 operated to determine an operation specifically, although remote controller 9 may have other types of keys.

Figures 2A, 2B:
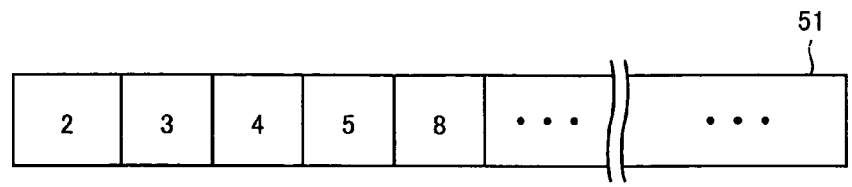
FIGS. 2A and 2B illustrate a channel map and a channel table.

Memory 5 has stored therein a channel map 51 and a channel table 52 shown in FIGS. 2A and 2B. With reference to FIG. 2A, channel map 51 has registered therewith the numbers of all channels corresponding to broadcast signal receivable through antenna 1 shown in FIG. 1.

With reference to FIG. 2B, channel table 52 has registered therewith information including data 81 indicating the number of each channel on which a corresponding broadcast signal is transmitted, data 82 indicating whether the channel's number has been registered with channel map 51, and data 83 indicating by a flag whether XDS information exists on the channel's broadcast signal. The data 83 flag set to "0" indicates whether XDS information exists on a corresponding channel's broadcast signal is undetermined. The flag set to "1" indicates that XDS information exists on a corresponding channel's broadcast signal. The flag set to "−1" indicates that with respect to a corresponding channel's broadcast signal a search for XDS information has not yet been conducted.

Figure 3A:
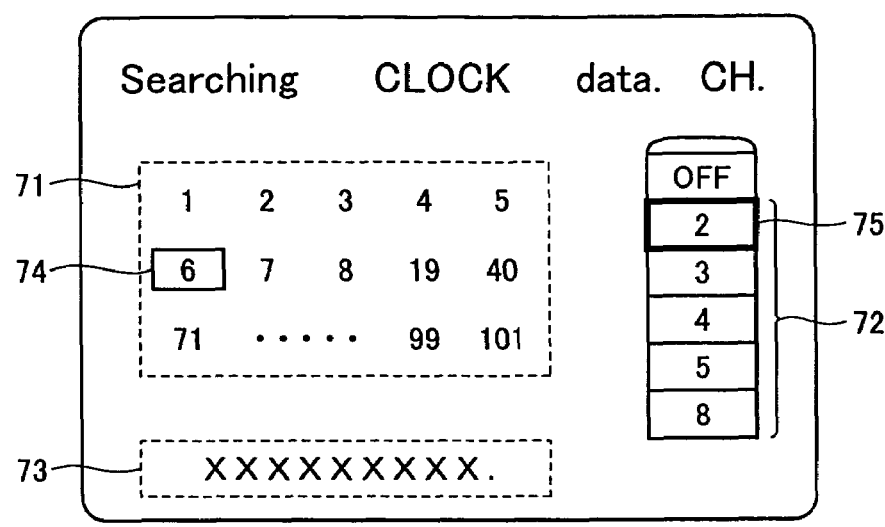
FIGS. 3A and 3B show an example of a screen displayed in searching for XDS information.
Figure 3B:
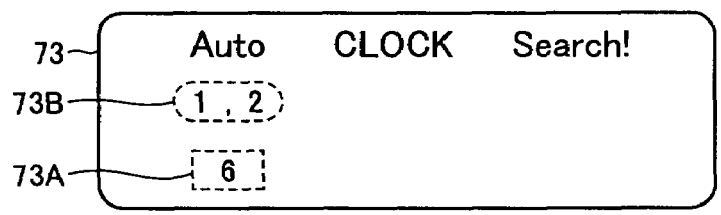

FIGS. 3A and 3B show an example of a screen displayed on display unit 6 in searching for XDS information. On the FIG. 3A screen, regions 71, 72 and 73 display information. FIG. 3B shows contents displayed in region 73 while an available-time process RT described later is being performed.

Region 71 displays the numbers of any channels on which a corresponding broadcast signal is transmitted, whether or not the FIG. 1 reception device is capable of receive the corresponding broadcast signal. Region 72 displays the number of a channel allowing the corresponding broadcast signal to be received by the FIG. 1 device. Region 71 may display content based on data 82 of channel table 52. Region 72 may display content based on information previously stored in channel map 51. While an operation (or scanning) is being performed to search for XDS information on a broadcast signal received through a channel, region 73 displays in accordance with a result of the search a variety of messages including the number of a channel on which XDS information has been obtained.

Regions 71 and 72 display rectangular cursors 74 and 75, respectively, used to designate a channel number. Cursors 74 and 75 move on a screen as cursor key 91 of remote controller 9 is operated. The FIGS. 3A and 3B screens display information, as controlled by MPU 4, superimposed by display processing portion 7 in accordance with the OSD on a screen of video signal 23.

Figure 4:
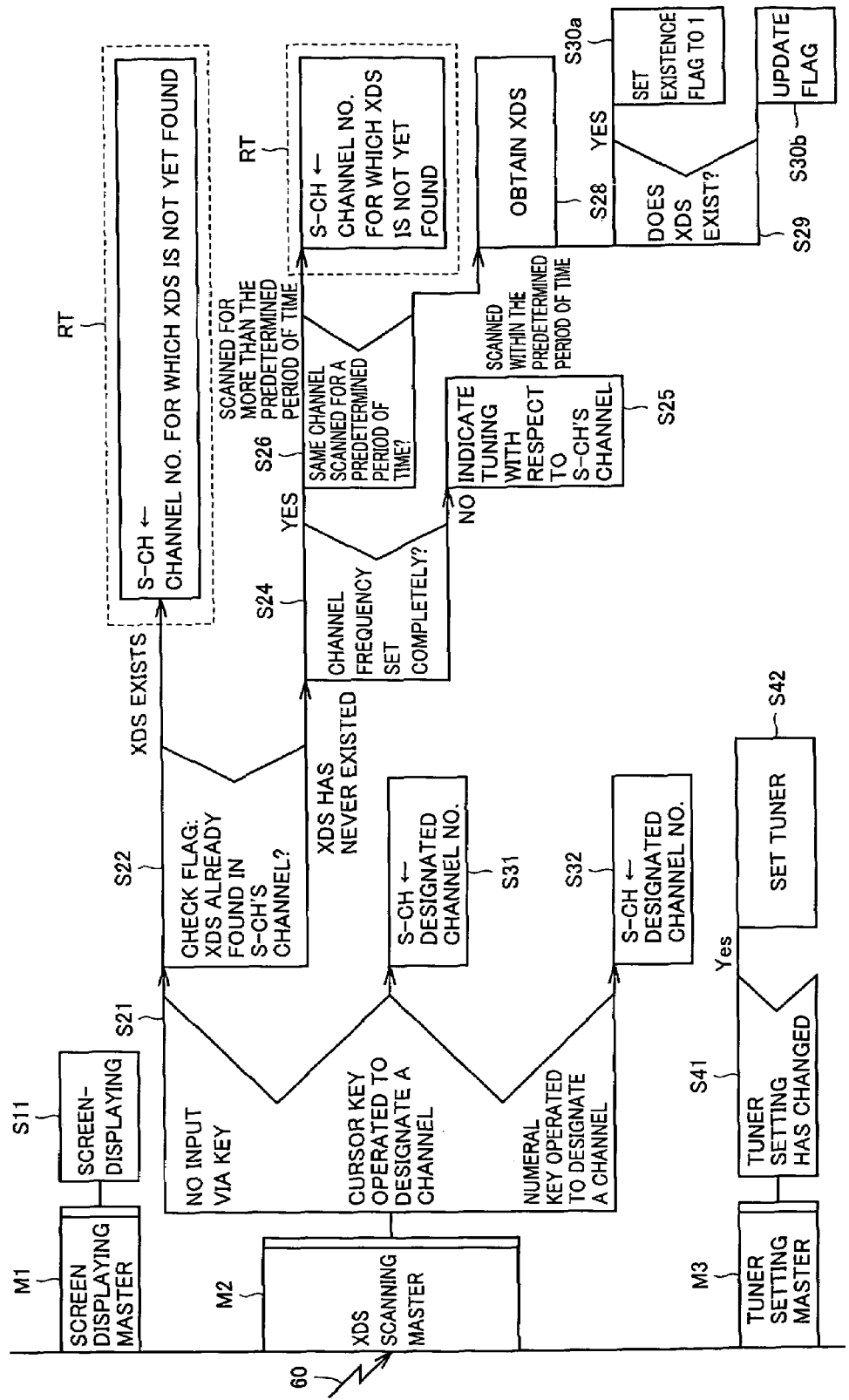
FIG. 4 shows a procedure of a process related to obtaining XDS information, as applied to the present embodiment.
Figure 5:
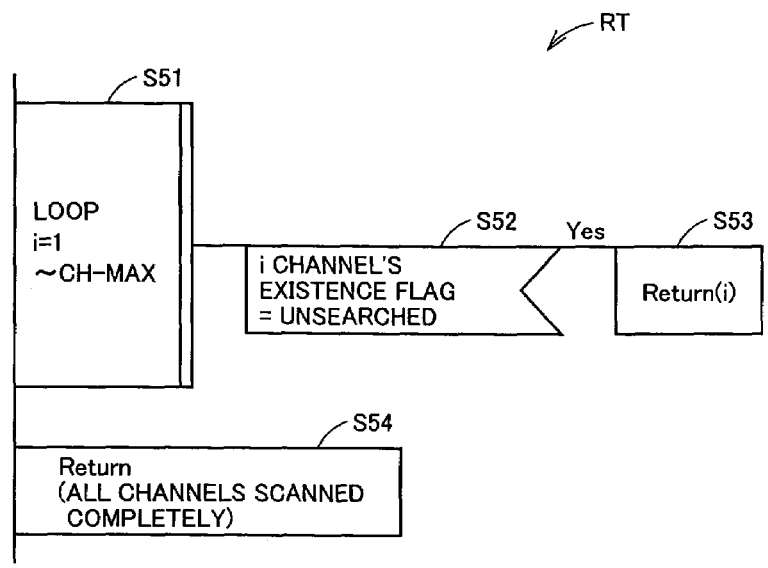
FIG. 5 shows a procedure of a process related to obtaining XDS information, as applied to the present embodiment.

FIGS. 4 and 5 represent a procedure of a process involved in obtaining XDS information, as applied to the present embodiment. FIGS. 4 and 5 represent the procedure in a Problem Analysis Diagram (PAD).

In the FIG. 4 PAD, a screen displaying master M1, an XDS scanning master M2 and a tuner setting master M3 configured of tasks, respectively, are executed by task control of MPU 4 in a multi-tasking manner. During multi-task execution when remote controller 9 is operated and via remote control reception portion 8 an input is received via key to designate a channel for which scanning is desired MPU 4 accepts the input as an interrupt 60 and abandons a currently executed task, i.e., cancels the execution of the task and shifts to executing a predetermined task. In the present embodiment the predetermined task is XDS scanning master M2.

Screen displaying master M1 includes step (S) 11 to control displaying a screen on display unit 6. XDS scanning master M2 includes S21-S32 and available-time process RT to perform a process to obtain XDS information in accordance with an input via remote controller 9 by a user using a key. Tuner setting master M3 includes S41 and S42 to allow tuner 2 to perform a tuning process. FIG. 5 shows a procedure corresponding to process RT of FIG. 4.

In accordance with the FIG. 4 PAD, XDS information is obtained by an operation, as described hereinafter. Note that in that operation, a channel to be scanned can be selected from different types of channel groups, as described hereinafter.

Selection from a Group of All Channels

When a user selects a channel to be scanned from all channels on which respectively corresponding broadcast signals are transmitted, i.e., the group of channels displayed in region 71 of FIG. 3, whether or not the broadcast signals can be received, an operation is performed, as described hereinafter.

The FIG. 4 process starts. A user confirms a list of channel numbers displayed in region 71 of FIG. 3 and designates the number of a channel to be scanned by operating cursor key 91 of remote controller 9 to move cursor 74. As it is moved, cursor 74 indicates a channel, for which scanning XDS information is started. Herein, the user can refer to the channel number list while he/she can designate a channel, as desired. This can facilitate and ensure that the user can designate a channel, as desired. Note that while scanning is performed for XDS information when the user operates cursor 74 to designate a different channel, as desired, MPU 4 cancels the current scanning operation and starts to scan with respect to the newly designated, desired channel.

Initially the user moves cursor 74 in region 71 to designate a desired channel number ("6" in FIG. 3). In response, screen displaying master M1 displays cursor 74 on a screen at a position shown in FIG. 3 via display processing portion 7 (S11).

Furthermore, XDS scanning master M2 receives operation signal 24 from remote controller 9 via remote control reception portion 8 as interrupt 60 and determines that there is an input via cursor key 91 (S21). Accordingly, a variable S-CH, indicating the number of a channel to be scanned, is set to "6" (S31).

When variable S-CH is set to "6", XDS scanning master M2 again determines whether there is an input via a key (S21). As the user does not enter an input via a key, a decision is made as to whether XDS information has been found with respect to the channel number (of "6") indicated by variable S-CH (S22).

More specifically, channel table 52 is searched to determine whether data 81 of the channel number ("6") indicated by variable S-CH is correlated to data 83 of a flag of "−1" or "0" (S22). If a decision is made that the flag is "−1" or "0" XDS information has never been existed on a broadcast signal of the channel number ("6") and a decision is made as to whether setting a frequency corresponding to variable S-CH's channel number ("6") has been completed in tuner 2 (S24). If not then an instruction is issued to perform a tuning process for the channel indicated by variable S-CH (S25).

When the instruction to perform the tuning process is issued, tuner setting master M3 determines that the tuner 2 setting has changed (YES at S41) and performs a process of setting tuner 2 (S42). More specifically, a tuning signal 20 indicating a frequency of a broadcast signal corresponding to a designated channel (the channel number "6" indicated by variable S-CH) is output to tuner 2. Tuner 2 is driven by the applied tuning signal 20 to start the tuning process.

Thereafter as XDS scanning master M2 does not detect an input by a user via a key (S21), master M2 undergoes S22 and determines that setting a frequency corresponding to the channel number ("6") of variable S-CH has been completed in tuner 2 (S24). Thereafter for the variable S-CH's channel number ("6") scanning is started and thereafter a decision is made as to whether the scan continues for a predetermined period of time (S26). If a decision is made that the scan continues within the predetermined period of time, master M2 moves on to an XDS acquisition process (S21) described later. If the scan continues for more than the predetermined period of time then the master moves on to available-time process RT, as described later.

The S26 decision is made in accordance with whether with respect to the scanning of channel number ("6") of variable S-CH the user operates decision key 93 to enter an input to indicate a decision to obtain XDS information within a predetermined period of time after a key is operated to input a designation of a desired channel.

When the input via decision key 93 is detected within the predetermined period of time then XDS extraction information 22 is obtained as based on broadcast signal 21 extracted through a tuning process (S28) and from XDS extraction information 22 whether XDS information exists or not is determined (S29). If XDS information exists then in channel table 52 the corresponding data 83 is set to "1" (S30a). Furthermore, master M1 at S11 allows region 73 to display a message accordingly. If XDS information does not exist then in channel table 52 the corresponding data 83 is updated from "−1" to "0" or held "0" (S30b). Furthermore, master M1 allows at S11 region 73 to display a message accordingly.

If the predetermined period of time has elapsed and an input via decision key 93 is still not detected then master M2 decides that the user leaves the system without making a final decision of an auto-adjust channel on which XDS information should be obtained, i.e., that scanning with respect to a single desired channel is uselessly repeated, and master M2 performs available-time process RT.

Available-time process RT provides a process for performing scanning with respect to each channel other than a desired channel designated by variable S-CH that is unsearched for XDS information, which is indicated in the corresponding data 83 by "−1".

With reference to FIG. 5, in process RT, as a variable i a channel number of 1 to a variable CH-MAX indicating a largest channel number are sequentially set (S51), while a process is performed, as follows: for a channel set as variable i, channel table 52 is searched through and if the variable i channel's data 81 corresponds to data 83 indicating that XDS information is unsearched for (i.e., "−1") (S52) the variable i channel number is set as an argument and the control returns to an upper step (S53). As such, until a subsequent designation of a channel number input by the user via cursor key 91 or numeral key 92 is detected, the variable i channel number is set as variable S-CH and scanning is repeated. Thus 1 to variable CH-MAX indicating a largest channel number are sequentially set as variable i and with respect thereto scanning is repeated. Scanning thus completes for all channels (S54).

In process RT during an available time before an input via a key that designates a channel to be scanned is detected a scanning operation can be performed for a channel for which scanning has not yet been performed. In performing process RT, with reference to FIG. 3B, in region 73 master M1 displays information. Information 73A indicates the number of a channel currently scanned by process RT, and information 73B indicates sequentially the number of a channel having been scanned by process RT and having XDS information detected thereon.

If at S22 a decision has been made for a desired channel designated by an input via a key that XDS information exists then master M1 allows at S11 a message to be displayed accordingly in region 73 and process RT is performed.

Figure 6:
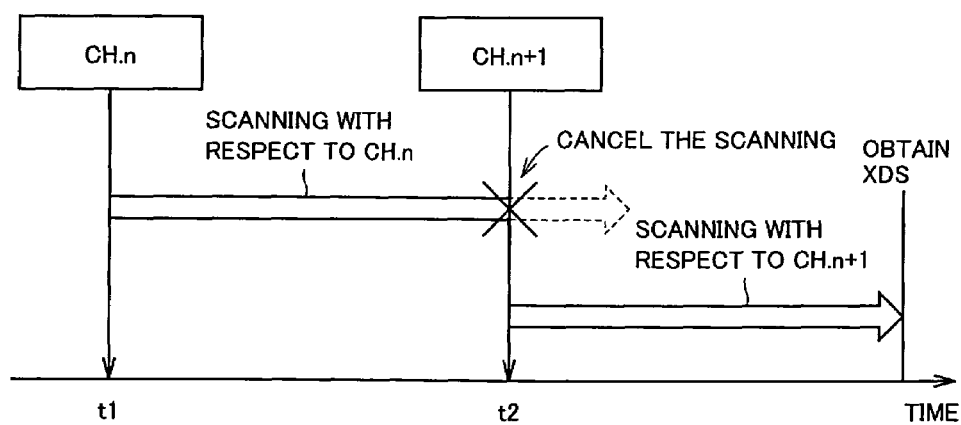
FIG. 6 schematically represents a feature of the FIG. 4 procedure.

FIG. 6 schematically represents a feature of the FIG. 4 procedure. With reference to FIG. 6, at time t1 a user designates a desired channel CH.n and scanning starts for the channel. At time t2 a different desired channel CH.n+1 is designated. The current scanning operation with respect to channel CH.n is canceled and for the currently designated channel CH.n+1 a tuning operation is performed and scanning starts. As such, in scanning, a latest desired channel designated by a user is prioritized. Excellent operability can be provided.

Selection from a Group Corresponding to a Channel Group Registered with Channel Map 51

Normally, XDS information cannot be obtained with respect to a channel on which a broadcast signal cannot be received. Accordingly, limiting a channel to be scanned to a channel group registered with channel map 51 allows XDS information to be obtained more efficiently than setting all channels as candidates for selection, as described above. In that case, with reference to FIG. 3A, the user can operate cursor 75 in region 72 corresponding to a channel group, similarly as has been described previously, to designate a desired channel for which scanning is performed and from which XDS information should be obtained. Herein, except that the number of a channel to be selected is selected from region 72 (channel map 51) the operation is similar to that illustrated in FIG. 4.

Note that adaptation may be made to be also capable of scanning with respect to a channel having a number that is not registered with channel map 51 (i.e., a channel number that is not displayed in region 72) to provide enhanced operability. More specifically, when a decision is made that a user operating numeral key 92 of remote controller 9 directly inputs the number of a channel as desired (a channel that is not displayed in region 72) (S21) the channel number is set as variable S-CH (S32) and scanning is performed for the designated channel. Herein, except that a desired channel number is designated directly by operating numeral key 92, the operation is similar to that described with reference to FIG. 4.

Thus a channel unregistered with channel map 51 that has its number input by a user using numeral key 92, as desired, can also be subjected to scanning. This can eliminate limitation on candidate channel that can be a subject to be scanned. Operability can thus be enhanced.

In the present embodiment, during an operation to obtain time information with respect to a designated channel when a desired channel is designated a shift occurs to an operation to obtain time information with respect to the desired channel. Simply by designating a desired channel, the user can obtain time information for counting the current time, from a broadcast signal of the desired channel as prioritized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A broadcast reception device comprising:
   reception means for receiving a broadcast signal;
   time information acquisition means for performing an operation searching for and acquiring time information for counting a current time, said time information acquisition means including:
      signal extraction means for extracting from the broadcast signal a designated broadcast signal corresponding to a designated channel; and
      search means for searching for said time information from the designated broadcast signal extracted by said signal extraction means,
   wherein when a desired channel is newly selected, said time information acquisition means cancels the acquisition operation currently performed and performs a new acquisition operation with respect to said desired channel that is newly selected; and
   processing means for designating a channel unsearched by said search means for said time information and causing said time information acquisition means to perform the acquisition operation,
   wherein said processing means is started when a decision to acquire time information is not indicated with respect to a search performed on said desired channel by said search means for said time information.

2. The broadcast reception device of claim 1, further comprising channel designation means for designating said desired channel via an external operation.

3. The broadcast reception device of claim 2, wherein said channel designation means includes means for selecting and designating said desired channel from a channel group allowing a corresponding broadcast signal to be received by said reception means.

4. The broadcast reception device of claim 3, wherein said channel designation means further includes channel list display means displaying said channel group in a list.

5. The broadcast reception device of claim 2, wherein said channel designation means includes means for selecting and designating said desired channel from a channel group with a corresponding broadcast signal transmitted thereon.

6. The broadcast reception device of claim 5, wherein said channel designation means further includes channel list display means displaying said channel group in a list.

7. The broadcast reception device of claim 2, wherein said channel designation means includes means for directly designating said desired channel.

8. The broadcast reception device of claim 1, wherein the broadcast signal comprises one of a group consisting of extended data services information and Rating Region Table information.

9. The broadcast reception device of claim 1, further comprising a channel table, wherein the channel table comprises:
   first data indicating a channel number corresponding to the broadcast signal;
   second data indicating whether the channel number has been registered with a channel map; and
   a data flag indicating a status of the time information of the broadcast signal.

10. A broadcast reception method comprising the steps of:
   receiving a broadcast signal;
   searching for and acquiring time information for counting a current time,
   the step of acquiring time information including the steps of:
      extracting a designated broadcast signal corresponding to a designated channel from the broadcast signal received at the step of receiving; and
      searching for said time information from the designated broadcast signal extracted at the step of extracting,
   wherein when a desired channel is newly selected, the step of acquiring time information currently performed is cancelled and a new acquisition operation is performed with respect to said desired channel that is newly selected; and
   a processing step for designating a channel unsearched by the step of searching for said time information and causing said step of acquiring time information to begin,
   wherein said processing step is started when a decision to acquire time information is not indicated with respect to a search performed on said desired channel by the step of searching for said time information.

* * * * *